United States Patent

Dreher et al.

[15] 3,643,738
[45] Feb. 22, 1972

[54] WETTABILITY CONTROL IN AN OIL RECOVERY PROCESS

[72] Inventors: Karl D. Dreher; Michael Holmes, both of Littleton, Colo.

[73] Assignee: Marathon Oil Company, Findlay, Ohio

[22] Filed: May 28, 1970

[21] Appl. No.: 41,477

[52] U.S. Cl. .................................................166/252, 166/268
[51] Int. Cl. .................................E21b 43/16, E21b 49/00
[58] Field of Search..................166/250, 252, 268, 273–275; 73/151, 152

[56] References Cited

UNITED STATES PATENTS

| | | | |
|---|---|---|---|
| 3,288,213 | 11/1966 | King et al. | 166/274 |
| 3,254,714 | 6/1966 | Gogarty et al. | 166/274 |
| 2,792,894 | 5/1957 | Graham et al. | 166/274 X |
| 3,028,912 | 4/1962 | Berry et al. | 166/252 |
| 3,362,473 | 1/1968 | Foster | 166/252 X |
| 3,468,377 | 9/1969 | Dunlap et al. | 166/274 |
| 3,476,184 | 11/1969 | Davis | 166/275 X |
| 3,480,080 | 11/1969 | Murphy | 166/252 |
| 3,482,632 | 12/1969 | Holm | 166/275 X |

*Primary Examiner*—Ian A. Calvert
*Attorney*—Joseph C. Herring, Richard C. Willson, Jr. and Jack L. Hummel

[57] ABSTRACT

For a reservoir rock having constant lithology (i.e. a given rock type and/or grain size) there exists a linear relationship between the log-log plot of $\sigma$ (interfacial tension) cosine $\theta$ (contact angle) vs. $\phi$ (porosity) $S_{wi}$ (irreducible water saturation). The contact angle (measure of the wettability of the reservoir rock) can be determined at in situ conditions from the above relationship, $\phi$ and $S_{wi}$ obtained from logging data, and $\sigma$ representative of the reservoir fluids. With this in situ determined $\theta$, a more efficient oil recovery process can be designed. For example, if the contact angle is less than 90°, the surfactant within the displacing fluid should have an HLB (hydrophil-lipophil balance) within the range of about 7–40 but if the contact angle is above 90°, the HLB number should be about 0–7. Such a design criteria is especially useful with petroleum sulfonates to obtain emulsion and micellar systems.

6 Claims, 2 Drawing Figures

PLOT OF $\sigma$ COS $\theta$ vs $\phi$ Swi

HLB vs EQUIVALENT WEIGHT OF AMMONIUM
PETROLEUM SULFONATES

PLOT OF $\sigma$ COS $\theta$ vs $\phi$ Swi

*INVENTOR*
MICHAEL HOLMES
KARL D. DREHER

BY

*ATTORNEY*

WETTABILITY CONTROL IN AN OIL RECOVERY PROCESS

CROSS REFERENCE TO RELATED APPLICATIONS

The linear relationship of $\sigma$ cosine $\theta$ vs. $\phi$ $S_{wi}$ on a log-log plot is taught in copending patent application, Ser. No. 41,480 filed May 28, 1970, inventors Michael Holmes and Karl D. Dreher.

BACKGROUND OF THE INVENTION

1. Field of the Invention

This invention relates to the design of secondary and tertiary recovery processes wherein surfactants are used. From logging data, the contact angle is determined, and this contact angle used to more effectively select the surfactant used in the displacing fluid.

2. Description of the Prior Art

It has been established in "Using Log-Derived Values of Water Saturation and Porosity," R. M. Morris and W. B. Biggs, Annual Symposium of Society of Professional Well Logging Analysts, 1967, Denver, Colorado, that in a reservoir having constant lithology at irreducible water saturations, the product of $\phi$ (porosity) $S_{wi}$ (irreducible water saturation) is a constant.

The contact angle "$\theta$," the formation fluid makes with the reservoir rock measured through the water, can be determined by standard laboratory procedure. However, such is subject to error since the core sample, on which the $\theta$ is determined, is generally not representative of the in situ reservoir conditions. More specifically, the methods of preserving the core adversely influence the resulting $\theta$. Also, atmospheric conditions, drilling mud contamination, etc., adversely influence the laboratory derived $\theta$. Thus, contact angles obtained by laboratory procedures are subject to error.

In designing a secondary or tertiary recovery process wherein surfactants are used in the displacing agent, it is known that the HLB (hydrophil-lipophil balance) number determines the characteristic of the surfactant to emulsify and solubilize the oil and water within the reservoir. Also, the particular displacing agent containing the surfactant should be designed to be compatible with the reservoir rock and to reduce the in situ contact angle to a value closer to 0°. Such can be effected by incorporating the correct surfactant within the displacing agent.

SUMMARY OF THE INVENTION

Applicants have discovered a novel method of designing a more efficient flooding process by determining the contact angle or wetting angle of the reservoir fluids at in situ conditions. The contact angle at in situ conditions is obtained by first establishing the relationship of $\sigma$ (interfacial tension) cosine $\theta$ (contact angle) vs. $\phi$ (porosity) $S_{wi}$ (irreducible water saturation) on a log-log plot. This can be obtained with core samples using mercury/air and distilled water/air and other systems as defined below. After the relationship is established, the $\phi$ and $S_{wi}$ for the particular zone to be flooded can be obtained from logging data, the $\sigma$ determined in a laboratory and the $\phi$ deduced by the linear relationship. By having an accurate $\theta$, the flooding process can be efficiently designed. For example, if the $\theta$ is above 90°, the surfactant should have a HLB number of 0–7 whereas if the contact angle is below 90°, the HLB number should be about 7–40.

BRIEF DESCRIPTION OF THE DRAWING

FIG. 2 shows the relationship of HLB vs. the equivalent weight of ammonium petroleum sulfonates.

DESCRIPTION OF THE PREFERRED EMBODIMENTS

Figure 1:
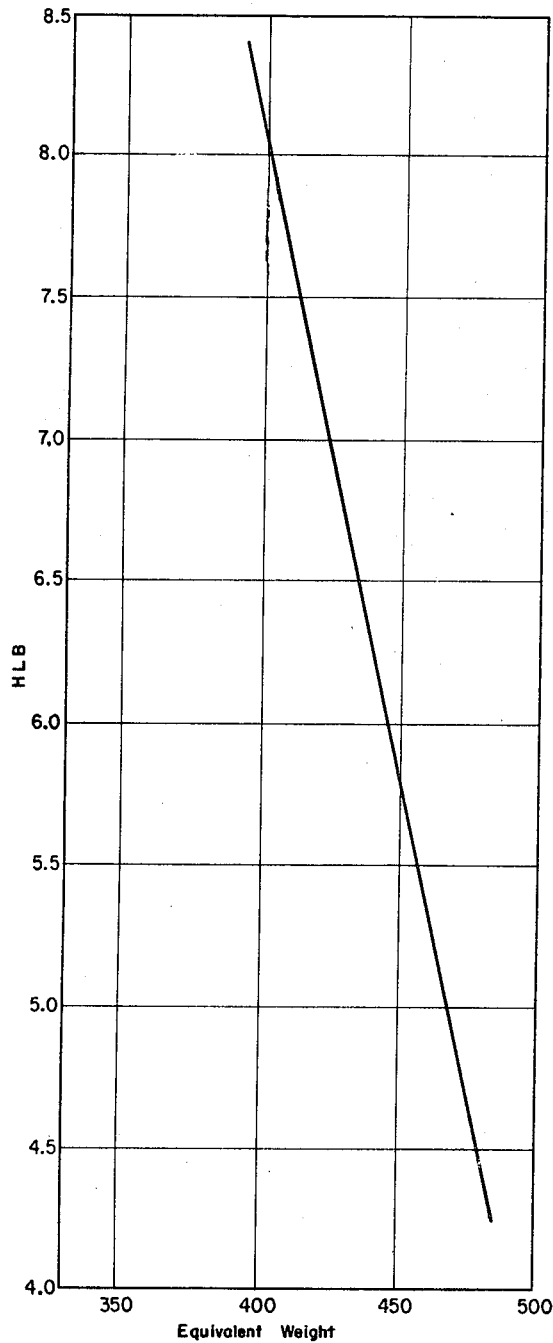
FIG. 1 exemplifies the relationship that can be established from a reservoir having constant lithology.
Figure 1:
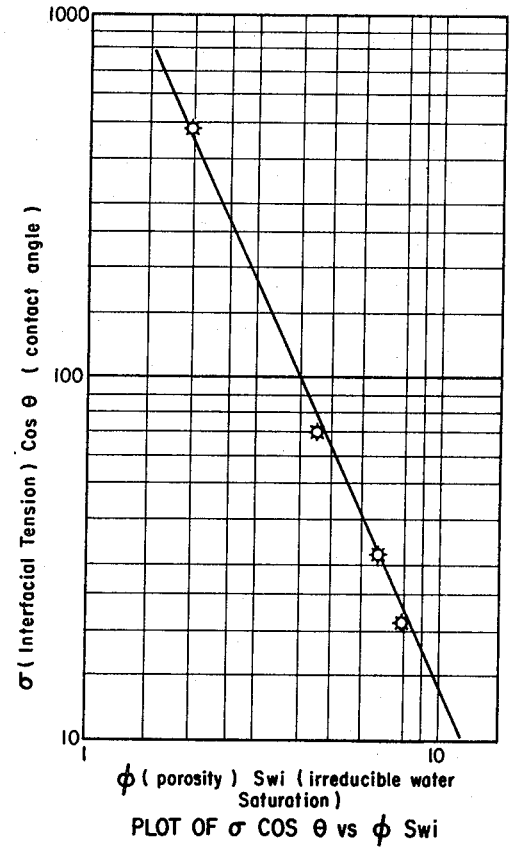

On the ordinate, the product of $\sigma$ cosine $\theta$ is plotted vs. the product of $\phi$ $S_{wi}$ on the abscissa. Plotted on the log-log graph, this relationship is linear. This $\phi$ $S_{wi}$ relationship is established by obtaining core samples from the reservoir, testing the samples in a centrifuge system or positive pressure system to obtain the plot of capillary pressure vs. saturation of the core. Systems, such as distilled water/air, toluene/distilled water, and tetradecane/distilled water, the air and distilled water being displaced from the core are useful. A mercury/air system is also useful to obtain data; a clean core saturated with air is subjected to displacement by mercury under a positive pressure and the saturation of the mercury vs. the capillary pressure is plotted. For the distilled water/air system, the core is saturated with air and then subjected to centrifugal forces so that the capillary pressure vs. the water saturation relationship is established. The same holds true for the toluene/distilled water and tetradecane/distilled water systems. From such relationships, the irreducible saturations of the core are determined for the particular system. The contact angles for the mercury/air and distilled water/air systems are 180° and the $\sigma$ (interfacial tension) of the mercury/air system is 487 dynes/centimeter at 15° C. whereas for the distilled water/air system it is 72 dynes/centimeter at 15° C. For the toluene/distilled water, tetradecane/distilled water, and optionally other systems, the $\theta$ and $\sigma$ are calculated from laboratory data. The $\phi$ is determined by standard laboratory techniques and is representative of continuous porosity. The $S_{wi}$ is determined from the above capillary pressure data. The product of $\sigma$ cosine $\theta$ is plotted on a log-log graph vs. the product of $\phi$ $S_{wi}$. FIG. 1 represents such a relationship. The $\phi$ and $S_{wi}$ for a particular portion of the reservoir is obtained from logging data, the $\sigma$ of the reservoir fluids calculated in a laboratory, and $\theta$ determined from the log-log relationship representative of the reservoir. A more efficient flooding process can be designed with this in-situ determined $\theta$.

Fluid saturations are directly influenced by the contact angle (rock wettability) in an oil-bearing subterranean formation. Such has a pronounced influence on the flow of fluids in the formation. Control of the wettability, or the contact angle, is important in oil recovery processes if an efficient and economical process is to be obtained. Regulating or controlling the contact angle or wettability of the surface can be accomplished by selective absorption and desorption of surface active agents in the displacing fluid used to recover the oil from the subterranean formation. That is, by choosing the correct surfactant, for example in an emulsion or micellar dispersion flooding process or in any flooding process wherein surfactants are used, improved oil recoveries can be realized. Other additives optionally incorporated into the displacing fluid should be chosen such that the overall characteristic of the surfactant is not appreciably changed from the originally designed surfactant.

A design basis for choosing the surfactant is the HLB (hydrophil-lipophil balance) member. That is, surfactants can be characterized as having a certain average HLB number. This HLB number is indicative of the ability of the surfactant to emulsify oil and water. The HLB number indicates the relative distribution of the hydrophilic and lipophilic portions of the surfactant—see Paul Becker's "Principles of Emulsion Technology," 1955, pp. 104–109 for definition of HLB. The HLB numbers of different surfactants are algebraically additive; thus a blend of surfactants can have an average HLB number of 7 but can contain HLB numbers of 1–40.

The HLB number of a surfactant can be calculated from empirically derived group numbers by the formula (*Interfacial Phenomena*, Phenomena, Davies and Rideal, Academic Press, N.Y., N.Y., 1961, pp. 371–383):

HLB = $\Sigma$(hydrophilic group numbers)—$m$(group number per—CH$_2$—group)+7 wherein the group numbers are obtained from the following table:

HLB Group Numbers

| Hydrophilic groups | group number |
| --- | --- |
| $-SO_3^- Na^+$ | 38.7 |
| $-COO^- K^+$ | 21.1 |
| $-COO^- Na^+$ | 19.1 |
| Sulphonate | about 11 |
| Ester (sorbitan ring) | 6.8 |
| Ester (free) | 2.4 |
| $-COOH$ | 2.1 |
| Hydroxyl (free) | 1.9 |
| $-O-$ | 1.3 |
| Hydroxyl (sorbitan ring) | 0.5 |

| Lipophilic groups | |
| --- | --- |
| $-CH-$ ) | |
| $-CH_2-$ ) | |
| $-CH_3$ ) | 0.475 |
| $=CH-$ ) | |

| Derived group | |
| --- | --- |
| $-(CH_2-CH_2-O)-$ | hydrophilic group number = 0.33 |

Petroleum sulfonates have an HLB based on equivalent weight, thus an HLB number of 6 corresponds to an equivalent weight of about 450, an HLB number of 7 for an equivalent weight of about 420, and an HLB number of 8.0 for an equivalent weight of about 400—these equivalent weights are based on ammonium sulfonates. Petroleum sulfonates are preferred as the surfactant within the displacing fluid of this invention. FIG. 2 shows the relationship of HLB vs. equivalent weight of ammonium petroleum sulfonates.

If the contact angles is above 90°, the reservoir is oil-wet; and, if the contact angle is below 90°, the reservoir is water-wet. This determination is important if it is desired to make an oil-wet reservoir rock water-wet to improve secondary and tertiary recovery methods. For example, if the above is desired, sulfonates having an HLB of about 5 (about 470 equivalent weight) and the proper molecular structure can be blended into a surfactant mix to prepare the slug. Such sulfonates, or their equivalent surfactants, will selectively adsorb onto the oil-wet reservoir rock by means of hydrophobic interaction. The extent of such hydrophobic interactions can be adjusted by choosing sulfonates with the proper aromatic nucleus—e.g., the cohesive forces between alkyl naphthalene sulfonates is much greater than between alkyl benzene sulfonates. Therefore, alkyl naphthalene sulfonates are more prone to adsorb and form tightly packed adsorbed layers on the reservoir rock; and, the tighter the packing in the adsorbed layer, the more complete the conversion from oil-wet to a water-wet reservoir rock.

This adjustment of the wettability from completely oil-wet to completely water-wet can be accomplished by blending surfactants having different HLB numbers. If it is desired to make the reservoir rock completely water-wet, sufficient surfactants with the proper HLB number are blended into preferably a micellar dispersion to obtain a wetting angle of 0°.

Regarding sulfonates, the polar nature of the sulfonate group causes water to be preferentially adsorbed in a layer coincident with the sulfonate groups. The amount of water adsorbed and the degree of water-wetness imparted to the surface is further controlled by proper selection of counter-ions used in initial preparation of the slug. The hydrophilicy of the sulfonate group depends upon its associated salts and this effect progresses in the order: monovalent < divalent < trivalent. Within these groupings, e.g., the order is Li < Na < NH$_4$ < K and Mg. < Ca < Ba. Thus, proper consideration of sulfonate structure and salt selection can control the degree to which an oil-wet reservoir is or can be converted to a water-wet system.

If it is desired to convert a water-wet formation to an oil-wet system, the sulfonates used for this purpose should have a relatively high HLB number, i.e., definitely less than the equivalent weight of 470 and preferably less than 420. Also, the emulsion or micellar dispersion should preferably be an oil-external system.

With a water-wet reservoir rock, that is, having a contact angle below 90°, both oil-external and water-external displacing slugs are useful. Where the formation is flooded with a micellar dispersion followed by a mobility buffer (a slug containing a mobility reducing agent) and this in turn followed by a water drive, it is preferred to leave the reservoir rock water-wet after the micellar dispersion moves through the rock to make it more receptive to the water drive. When a "Pusher" polymer (a high molecular weight partially hydrolyzed polyacrylamide marketed by Dow Chemical Company) follows behind the micellar dispersion, the polymer has a tendency to be adsorbed onto the water-wet reservoir rock—the overall effect being to decrease the relative mobility of the mobility buffer; thus imparting a water-wet characteristic to the rock can improve the flooding characteristics by protecting against fingering.

This invention is particularly useful with emulsions and micellar dispersions. But, as mentioned earlier, it is useful with any system containing surfactants. The emulsions and micellar dispersions can contain water, hydrocarbon, surfactant, optionally cosurfactant (also identified as cosolubilizer and semipolar organic compound) and/or electrolite and other additives if desired, e.g., corrosion inhibiting agents, bactericides, etc.

It is not intended that this invention be limited to the particulars taught above. Rather, all equivalents obvious to those skilled in the art are intended to be incorporated within the scope of the invention as defined within the specification and appended claims.

What is claimed is:

1. A method of improving the recovery of oil from a subterranean formation characterized as having substantially content lithology and wherein a flooding agent comprised of surfactant is injected into at least one injection means and displaced through the formation toward at least one production means and oil is recovered through said production means, the method comprising:
   1. establishing a log-log relationship of $\sigma$ (interfacial tension) cosine $\theta$ (contact angle) vs. $\phi$ (porosity) $S_{wi}$ (irreducible water saturation) representative of the reservoir,
   2. obtaining from logging data $\phi$ and $S_{wi}$ for the particular formation within the reservoir,
   3. determining $\sigma$ substantially representative of the formation fluids within the reservoir,
   4. from the data of "(2)" and "(3)" and the relationship of "(1)," determining $\theta$, and based on this $\theta$ incorporating surfactant having sufficient HLB number and in sufficient amounts within the flooding agent to substantially reduce the $\theta$ toward a contact angle of 0°.

2. The process of claim 1 wherein surfactant having an average HLB number of about 7–40 is incorporated into the flooding agent when the $\theta$ is determined to be less than 90°.

3. The process of claim 1 wherein surfactant having an average HLB number of about 0–7 is incorporated into the flooding agent when the $\theta$ is determined to be greater than 90°.

4. The process of claim 1 wherein the flooding agent is emulsion.

5. The process of claim 1 wherein the flooding agent is a micellar dispersion.

6. The process of claim 1 wherein the surfactant is a petroleum sulfonate.

* * * * *

UNITED STATES PATENT OFFICE
CERTIFICATE OF CORRECTION

Patent No. 3,643,738   Dated 2/22/72

Inventor(s) Karl D. Dreher et al

It is certified that error appears in the above-identified patent and that said Letters Patent are hereby corrected as shown below:

| | |
|---|---|
| Col. 2, line 53: | Delete "member" and insert --number--. |
| Col. 4, line 37: (Claim 1) | Delete "content" and insert --constant--. |
| Col. 4, line 52: | Delete "(1," and insert --(1),--. |

Signed and sealed this 6th day of June 1972.

(SEAL)
Attest:

EDWARD M. FLETCHER, JR.
Attesting Officer

ROBERT GOTTSCHALK
Commissioner of Patents